United States Patent
Hsu

(10) Patent No.: US 8,310,190 B2
(45) Date of Patent: Nov. 13, 2012

(54) APPARATUS AND METHOD FOR DETECTING LOCK ERROR IN SENSORLESS MOTOR

(75) Inventor: Hsien-Wen Hsu, Hsinchu County (TW)

(73) Assignee: inergy Technology Inc., Hsinchu County (TW)

(*) Notice: Subject to any disclaimer, the term of this patent is extended or adjusted under 35 U.S.C. 154(b) by 360 days.

(21) Appl. No.: 12/843,845

(22) Filed: Jul. 26, 2010

(65) Prior Publication Data

US 2011/0074322 A1    Mar. 31, 2011

(30) Foreign Application Priority Data

Sep. 30, 2009   (TW) ................................ 98133212 A

(51) Int. Cl.
*H02P 6/00*      (2006.01)

(52) U.S. Cl. ......... 318/400.32; 318/400.21; 318/400.24; 318/400.36; 318/400.13; 318/400.14; 318/400.34; 318/400.35; 318/437; 318/466

(58) Field of Classification Search ............. 318/400.01, 318/700, 400.21, 400.1, 400.4, 400.13, 400.35, 318/400.36, 805, 437, 466, 400.24, 400.32, 318/400.33, 400.34; 324/600, 260, 178, 324/181, 160; 702/151, 163, 150
See application file for complete search history.

(56) References Cited

U.S. PATENT DOCUMENTS

| | | | | |
|---|---|---|---|---|
| 5,023,527 A * | 6/1991 | Erdman et al. | ........... | 318/400.34 |
| 5,043,643 A * | 8/1991 | Hedlund et al. | ........... | 318/254.2 |
| 6,570,360 B1 * | 5/2003 | Freeman | ........ | 318/798 |
| 7,158,332 B2 * | 1/2007 | Kokami | ......... | 360/75 |
| 7,531,976 B2 * | 5/2009 | Fukamizu et al. | ....... | 318/400.34 |
| 7,626,350 B2 * | 12/2009 | Mori et al. | ..... | 318/432 |
| 7,839,107 B2 * | 11/2010 | Sauter et al. | ............. | 318/400.35 |

* cited by examiner

*Primary Examiner* — Rita Leykin
(74) *Attorney, Agent, or Firm* — CKC & Partners Co., Ltd.

(57) ABSTRACT

An apparatus and a method for detecting a lock error in a sensorless motor are disclosed, where the apparatus includes a multiplexer, a negative booster, a comparator and a timer. The multiplexer can receive a coil voltage from the sensorless motor. The negative booster can receive a neutralizing voltage from the sensorless motor and drop the neutralizing voltage. The comparator can compare the coil voltage with the dropped neutralizing voltage for outputting a zero-crossing signal. The timer can count time duration during the zero-crossing signal maintained at the a logic level and determine the lock error in the sensorless motor when the time duration exceeds a predetermined period.

15 Claims, 5 Drawing Sheets

US 8,310,190 B2

APPARATUS AND METHOD FOR DETECTING LOCK ERROR IN SENSORLESS MOTOR

RELATED APPLICATIONS

This application claims priority to Taiwan Application Serial Number 98133212, filed Sep. 30, 2009, which is herein incorporated by reference.

BACKGROUND

1. Field of Invention

The present invention relates generally to an electronic device and an operating method thereof and, more particularly, to an apparatus and a method for detecting a lock error in a sensorless motor.

2. Description of Related Art

Owing to the prosperity of the industry and the commerce and the progress of the society recently, a product is designed for convenience, precision, and economy so that a present product is also better than the one before. For motors, manufacturers are unceasingly developing a sensorless motor with convenience and economy to achieve maximum results with little effort when a user manipulates the product.

It is an important technology to detect a lock error in a sensorless motor in the motor control field. However, when a lock error is detected in a sensorless motor, a deviation generated by a detecting circuit and a noise disturbance will let the detecting circuit make an incorrect determination.

As mentioned above, there are still inconveniences and defects existing in the present products, which need to be improved. Each and every manufacturer in relative art is eager to find the solution for preventing the detecting circuit from making an incorrect determination for a long time, but no solution has been found. Accordingly, how to detect a lock error in a sensorless motor precisely is an important research topic and a goal which needs to be achieved by the manufacturer in relative art currently.

SUMMARY

The present invention provides an apparatus and a method for detecting a lock error in a sensorless motor.

In one embodiment of the present invention, an apparatus for detecting a lock error in a sensorless motor comprises at least three coils converged on a neutral point. The apparatus comprises a multiplexer, a negative booster, a comparator, and a timer. The multiplexer can receive a coil voltage from one of the coils. The negative booster can receive a neutralizing voltage from the neutral point to drop the neutralizing voltage. The comparator can compare the coil voltage with the dropped neutralizing voltage to output a zero-crossing signal. When crossover occurs between the coil voltage and the dropped neutralizing voltage, the zero-crossing signal is converted from having a first logical level into having a second logical level or converted from having the second logical level into having the first logical level. The timer can count a time duration during the zero-crossing signal maintained at the first logical level and determine the lock error in the sensorless motor when the time duration exceeds a predetermined period.

As a result, the operation of dropping the neutralizing voltage overcomes a deviation generated by the comparator and a noise disturbance so that the comparator can discriminate the coil voltage from the dropped neutralizing voltage when the lock error in a sensorless motor occurs.

In another embodiment of the present invention, a method for detecting a lock error in a sensorless motor is provided, wherein the sensorless motor comprises at least three coils converged on a neutral point. The method comprises the steps of receiving a coil voltage from one of the coils, receiving a neutralizing voltage from a neutral point and dropping the neutralizing voltage, comparing the coil voltage with the dropped neutralizing voltage to output a zero-crossing voltage, wherein when crossover occurs between the coil voltage and the dropped neutralizing voltage, the zero-crossing signal is converted from having a first logical level into having a second logical level or converted from having the second logical level into having the first logical level; and counting a time duration during the zero-crossing signal maintained at the first logical level and determining the lock error in the sensorless motor when the time duration exceeds a predetermined period.

As a result, the operation of dropping the neutralizing voltage overcomes a deviation generated by the comparator and a noise disturbance so that the comparator can discriminate the coil voltage from the dropped neutralizing voltage when the lock error in a sensorless motor occurs.

In yet another embodiment of the present invention, an apparatus for detecting a lock error in a sensorless motor comprises at least three coils converged on a neutral point. The apparatus comprises a multiplexer, a negative booster, a comparator, and a timer. The multiplexer can receive a coil voltage from one of the coils. The negative booster can drop the coil voltage. The comparator can compare the neutralizing voltage of the neutral point with the dropped coil voltage to output a zero-crossing signal. When crossover occurs between the neutralizing voltage and the dropped coil voltage, the zero-crossing signal is converted from having a first logical level into having a second logical level or converted from having the second logical level into having the first logical level. The timer can count a time duration during the zero-crossing signal maintained at the first logical level and determine the lock error in the sensorless motor when the time duration exceeds a predetermined period.

As a result, the operation of dropping the neutralizing voltage overcomes a deviation generated by the comparator and a noise disturbance so that the comparator can discriminate the coil voltage from the dropped neutralizing voltage when the lock error in a sensorless motor occurs.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
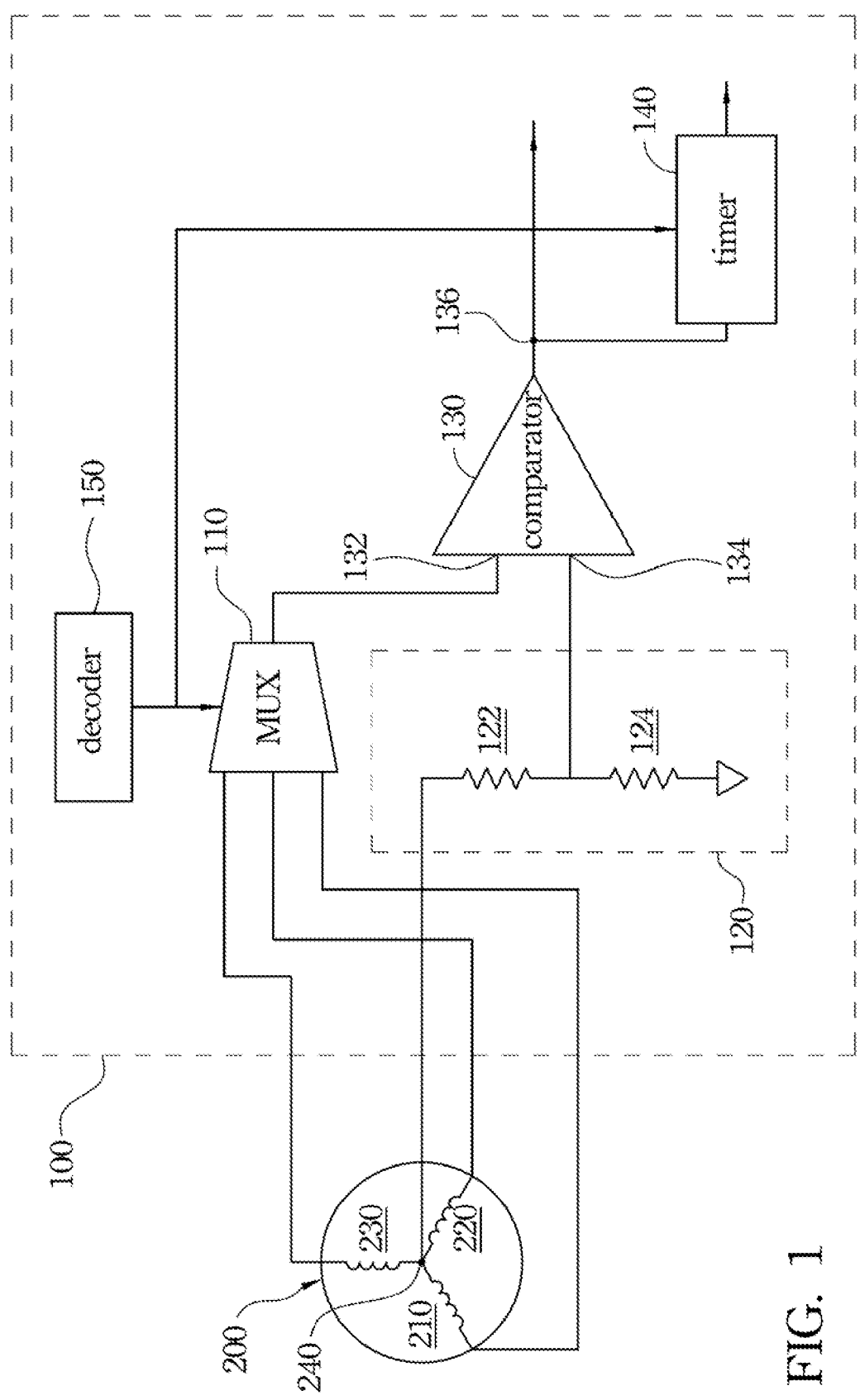
FIG. 1 shows schematically a block diagram of an apparatus for detecting a lock error in a sensorless motor according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

FIG. 1 shows schematically a block diagram of an apparatus 100 for detecting a lock error in a sensorless motor 200 according to one embodiment of the present invention. As shown in FIG. 1, the sensorless motor 200 comprises at least three coils 210, 220, and 230 converged on a neutral point 240. The apparatus 100 comprises a multiplexer 110, a negative booster 120, a comparator 130, and a timer 140.

In this embodiment, the multiplexer 110 is electrically connected to the coils 210, 220, and 230, and the negative booster 120 is electrically connected to the neutral point 240. The input terminal 132 of the comparator 130 is electrically connected to the multiplexer 110, the input terminal 134 of the comparator 130 is electrically connected to the negative booster 120, and the output terminal 136 of the comparator 130 is electrically connected to the timer 140.

In addition, the multiplexer 110 can receive a coil voltage from one of the coils 210, 220, and 230, and the negative booster 120 can receive a neutralizing voltage from the neutral point 240 to drop the neutralizing voltage. The comparator 130 can compare the coil voltage with the dropped neutralizing voltage to output a zero-crossing signal. When crossover occurs between the coil voltage and the dropped neutralizing voltage, the zero-crossing signal is converted from having a first logical level into having a second logical level or converted from having the second logical level into having the first logical level. The timer 140 can count a time duration during the zero-crossing signal maintained at the first logical level and determine the lock error in the sensorless motor 200 when the time duration exceeds a predetermined period.

As a result, the operation of dropping the neutralizing voltage overcomes a deviation generated by the comparator 130 and a noise disturbance so that the comparator 130 can discriminate the coil voltage from the dropped neutralizing voltage when the lock error in the sensorless motor occurs.

In this embodiment, the first logical level can be a logical high level, and the second logical level can be a logical low level. The apparatus 100 determines the lock error in the sensorless motor 200 when the time duration during the zero-crossing signal maintained at the high logical level exceeds a predetermined period.

Furthermore, the predetermined time duration depends on a rotational speed of the sensorless motor 200. The predetermined time duration becomes shorter when the rotational speed becomes faster, and the predetermined time duration becomes longer when the rotational speed becomes slower. A person with ordinary skill in the art can flexibly determine the predetermined time duration according to actual demand.

As shown in FIG. 1, the apparatus 100 further comprises a decoder 150. The decoder 150 is electrically connected to the multiplexer 110 and the timer 140. The decoder 150 can make the multiplexer 110 select one of the coils 210, 220, and 230 and make the timer 140 start to count the time duration during the zero-crossing signal maintained at the first logical level after the coil is selected. Therefore, the decoder 150 can control the multiplexer 110 and the timer 140 to perform a corresponding operation timely.

Moreover, the negative booster 120 comprises a first voltage divider 122 and a second voltage divider 124. The first voltage divider 122 is electrically connected to the neutral point 240, and the second voltage divider 124 is connected to the first voltage divider 122 in series, wherein the position at which the first voltage divider 122 and the second voltage divider 124 are connected to each other is electrically connected to the comparator 130.

Specifically, each of the first voltage divider 122 and the second voltage divider 124 can be a resistor for dropping the voltage. The resistance of the first voltage divider 122 and the second voltage divider 124 can be decided by a deviation generated by the comparator 130 and a noise disturbance so that the degree of the dropped neutralizing voltage is enough for the comparator to discriminate the coil voltage from the dropped neutralizing voltage when the lock error in a sensorless motor 200 occurs. For example, the resistance of the first voltage divider 122 is 1 kΩ, and the resistance of the second voltage divider 124 is 100 kΩ.

Figure 2:
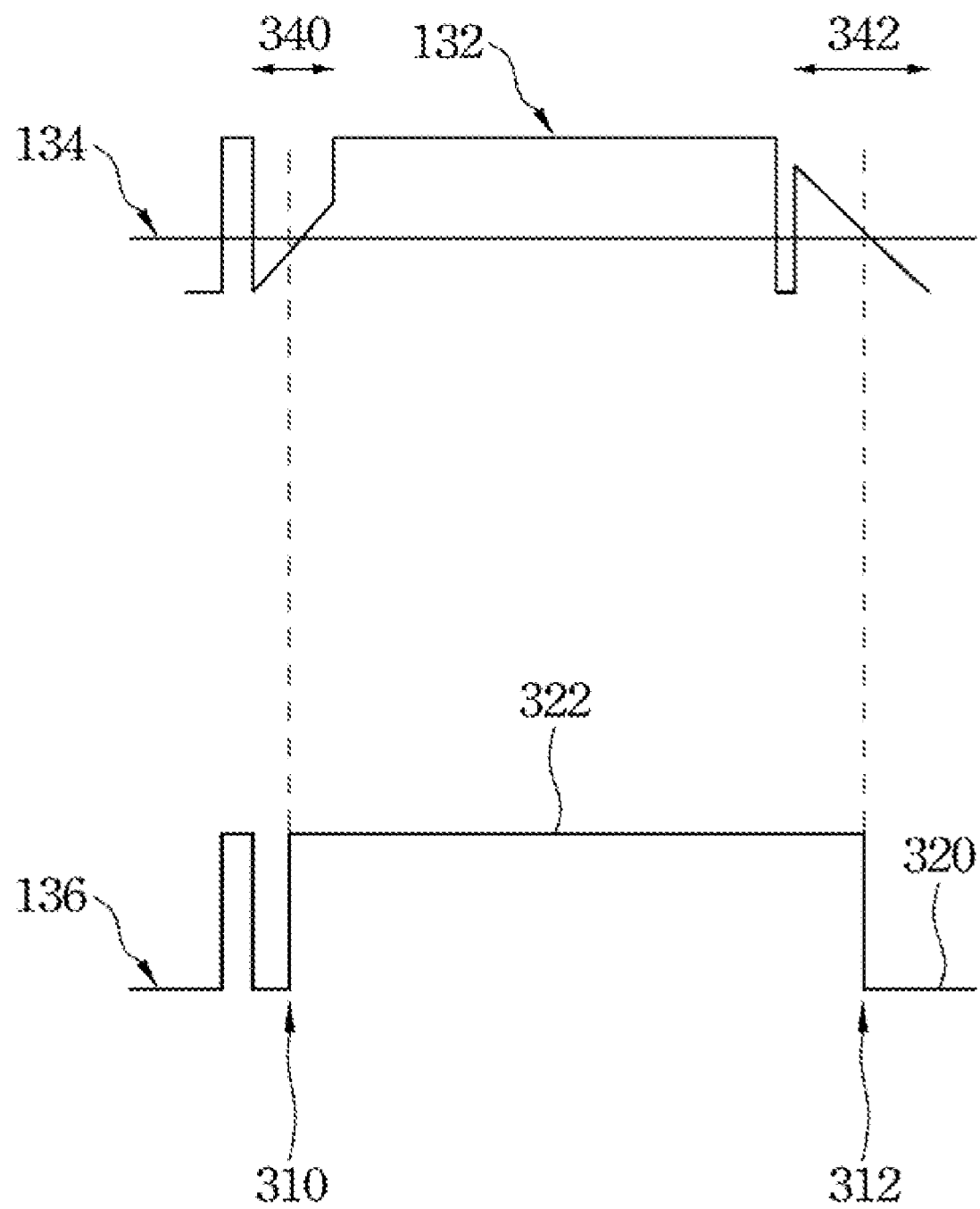
FIG. 2 shows schematically a voltage oscillogram of the comparator when no lock error occurs in the sensorless motor according to FIG. 1.

FIG. 2 shows schematically a voltage oscillogram for the comparator shown in FIG. 1 when no lock error occurs in the sensorless motor. As shown in FIG. 2, the crossover occurs between the voltage of the input terminal 134 of the comparator 130 and the voltage of the input terminal 132 of the comparator 130 in the interval 340, and the zero-crossing signal outputted from the output terminal 136 of the comparator 130 is converted from having the low logical level 320 into having the high logical level 322 in the zero-crossing point 310. The crossover also occurs between the voltage of the input terminal 134 of the comparator 130 and the voltage of the input terminal 132 of the comparator 130 in the interval 342, and the zero-crossing signal outputted from the output terminal 136 of the comparator 130 is converted from having the high logical level 322 into having the low logical level 320 in the zero-crossing point 312.

Figure 3:
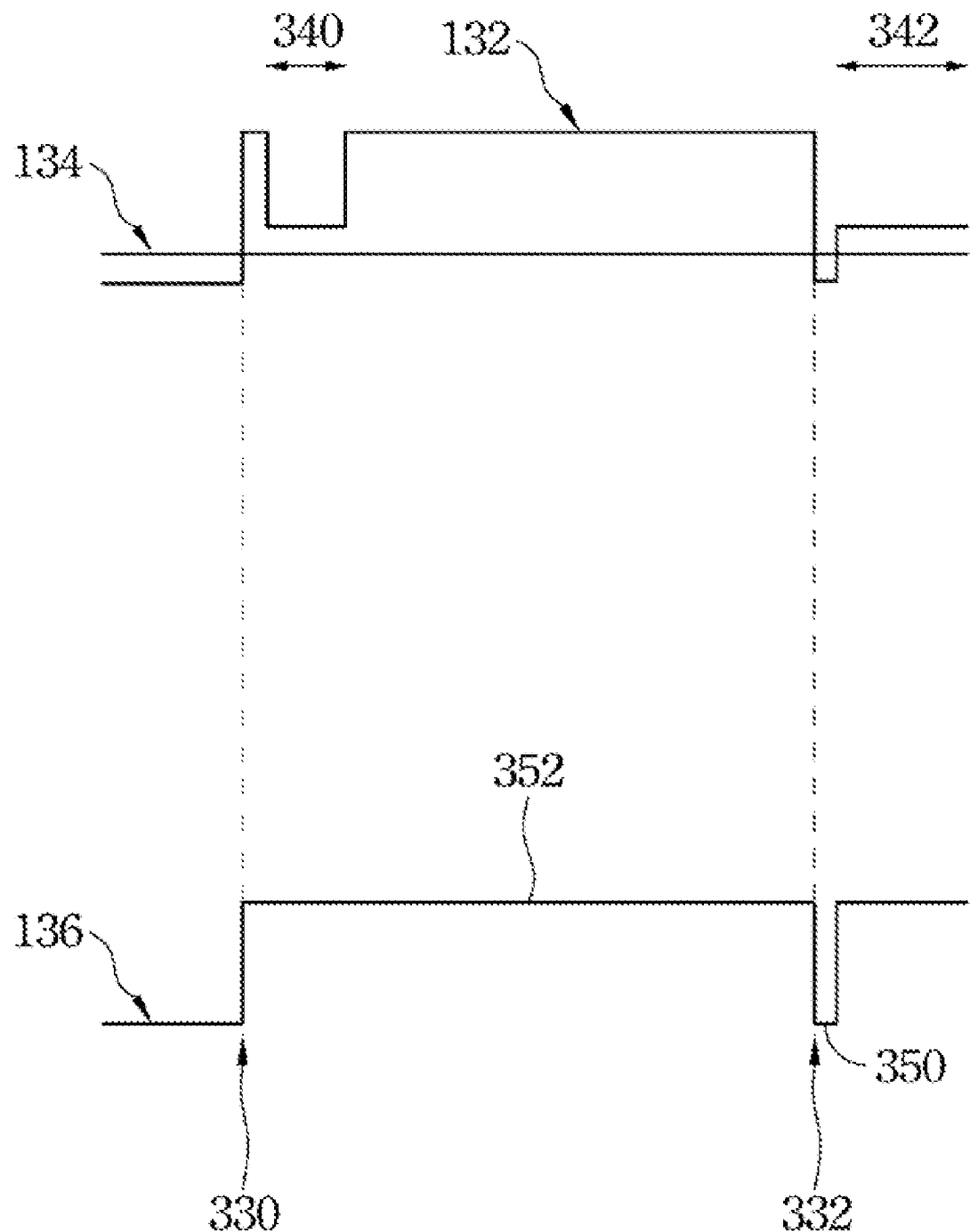
FIG. 3 shows schematically a voltage oscillogram of the comparator when the lock error occurs in the sensorless motor according to FIG. 1.

FIG. 3 shows schematically a voltage oscillogram for the comparator shown in FIG. 1 when the lock error occurs in the sensorless motor. As shown in FIG. 3, the voltage of the input terminal 134 of the comparator 130 is maintained at the low logical level in the interval 340 and 342. The crossover occurs between the voltage of the input terminal 134 of the comparator 130 and the voltage of the input terminal 132 of the comparator 130 in the zero-crossing point 330, and the zero-crossing signal outputted from the output terminal 136 of the comparator 130 is converted from having the low logical level 350 into having the high logical level 352. The crossover occurs between the voltage of the input terminal 134 of the comparator 130 and the voltage of the input terminal 132 of the comparator 130 in the zero-crossing point 332, and the zero-crossing signal outputted from the output terminal 136 of the comparator 130 is converted from having the high logical level 352 into having the low logical level 350.

In addition, no matter whether the sensorless motor 200 has a lock error, the waveforms of the coil voltage and the neutralizing voltage thereof are known knowledge for those skilled in the art and not the claimed scope of this invention so that there is no need to give unnecessary details herein.

It is noteworthy that if there is no negative booster 120 in FIG. 1, that is to say, the neutral point 240 can be electrically connected to the input terminal 134 of the comparator 130 directly. When a lock error is detected in the sensorless motor, the neutralizing voltage of the neutral point 240 and the coil voltage in the intervals 340 and 342 are almost the same because of the counter electromotive force being zero. In other words, the voltage of the input terminal 134 and the voltage of the input terminal 132 in the interval 340 and 342 are supposed to be nearly the same in theory, but the deviation generated by the comparator 130 and a noise disturbance make the voltage of the input terminal 134 become higher or lower than the voltage of the input terminal 132 so that the comparator 130 may probably make an incorrect determination.

Therefore, the negative booster 120 arranged in the apparatus 110 can drop the neutralizing voltage of the neutral point 240 so that the comparator 130 can discriminate the coil voltage from the dropped neutralizing voltage when a lock error in a sensorless motor occurs, for determining the lock error in the sensorless motor, when the time duration during the zero-crossing signal maintained at the same logical level exceeds a predetermined period.

Figure 4:
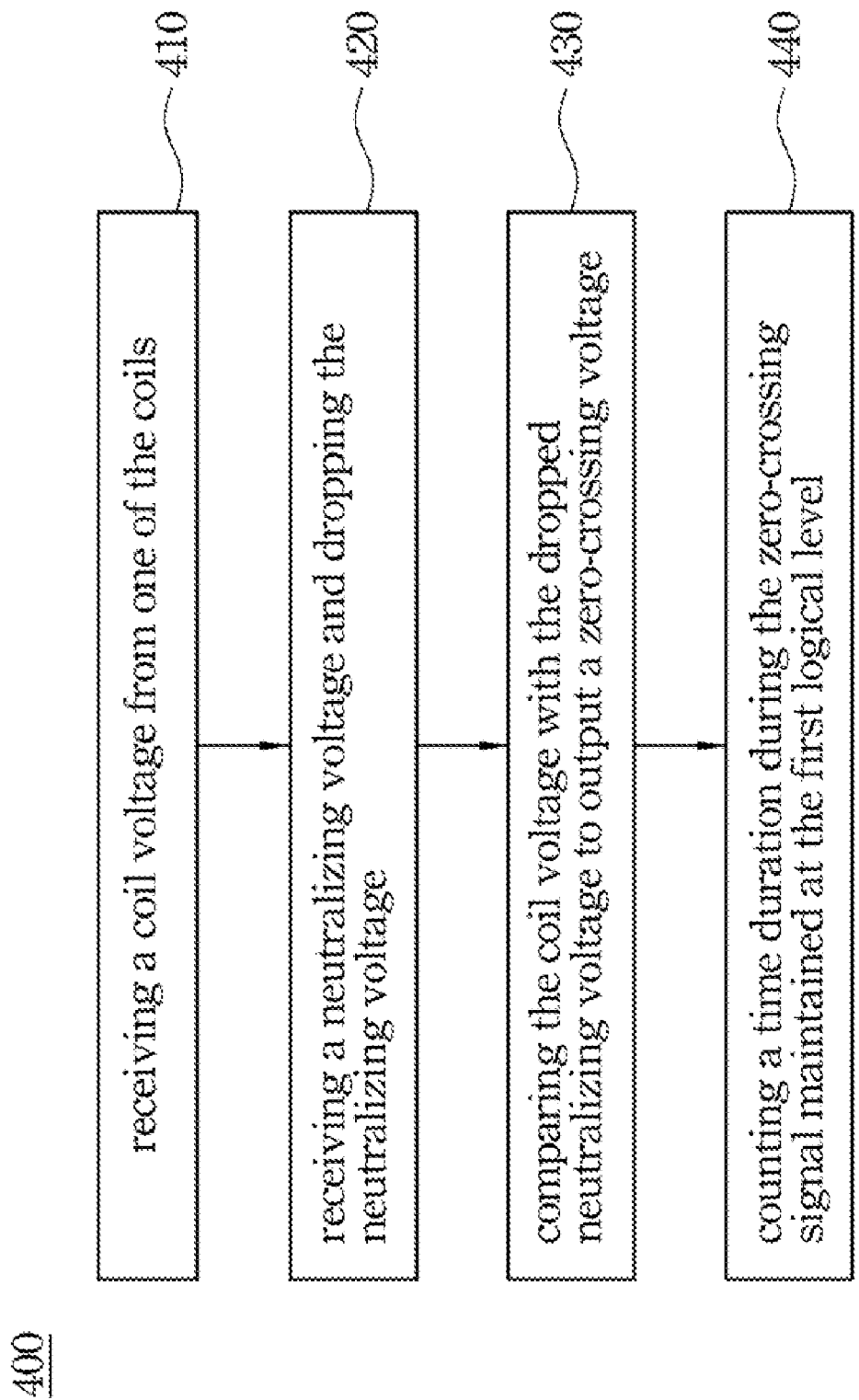
FIG. 4 shows schematically a flow diagram of a method for detecting a lock error in sensorless motor according to another embodiment of the present invention.

FIG. 4 shows schematically a flow diagram of a method for detecting a lock error in a sensorless motor according to another embodiment of the present invention. As shown in FIG. 4, the sensorless motor comprises at least three coils converged on a neutral point, and the method comprises the steps 410, 420, 430, and 440 (it should be noted that the sequence of the steps according to the embodiment of the present invention can be adjusted due to actual demand if not expressly stated. Moreover, all or part of the steps according to the embodiment of the present invention can be performed simultaneously.)

The method comprises the steps of receiving a coil voltage from one of the coils (step 410), receiving a neutralizing voltage from a neutral point and dropping the neutralizing voltage (step 420), comparing the coil voltage with the dropped neutralizing voltage to output a zero-crossing voltage, wherein when crossover occurs between the coil voltage and the dropped neutralizing voltage, the zero-crossing signal is converted from having a first logical level into having a second logical level or converted from having the second logical level into having the first logical level (step 430); and counting a time duration during the zero-crossing signal maintained at the first logical level and determining the lock error in the sensorless motor when the time duration exceeds a predetermined period (step 440).

As a result, the operation of dropping the neutralizing voltage overcomes a deviation generated by the comparator and a noise disturbance so that the comparator can discriminate the coil voltage from the dropped neutralizing voltage when the lock error in a sensorless motor occurs.

The first logical level at a high logical level is different from the second logical level. For example, the first logical level is the high logical level, and the second logical level is a low logical level. The method 400 determines the lock error in the sensorless motor 600 when the time duration during the zero-crossing signal maintained at the high logical level exceeds a predetermined period.

At step 410, a coil can be selected from the coils, and the coil voltage can be received from the selected coil after the coil is selected. At step 430, the time duration during the zero-crossing signal maintained at the first logical level can be counted after the coil is selected. As a result, the step 410 and the step 430 can be performed correspondingly.

Moreover, the hardware device for implementing the foregoing steps have been mentioned in the preceding embodiment so that there is no need to give unnecessary details herein.

Figure 5:
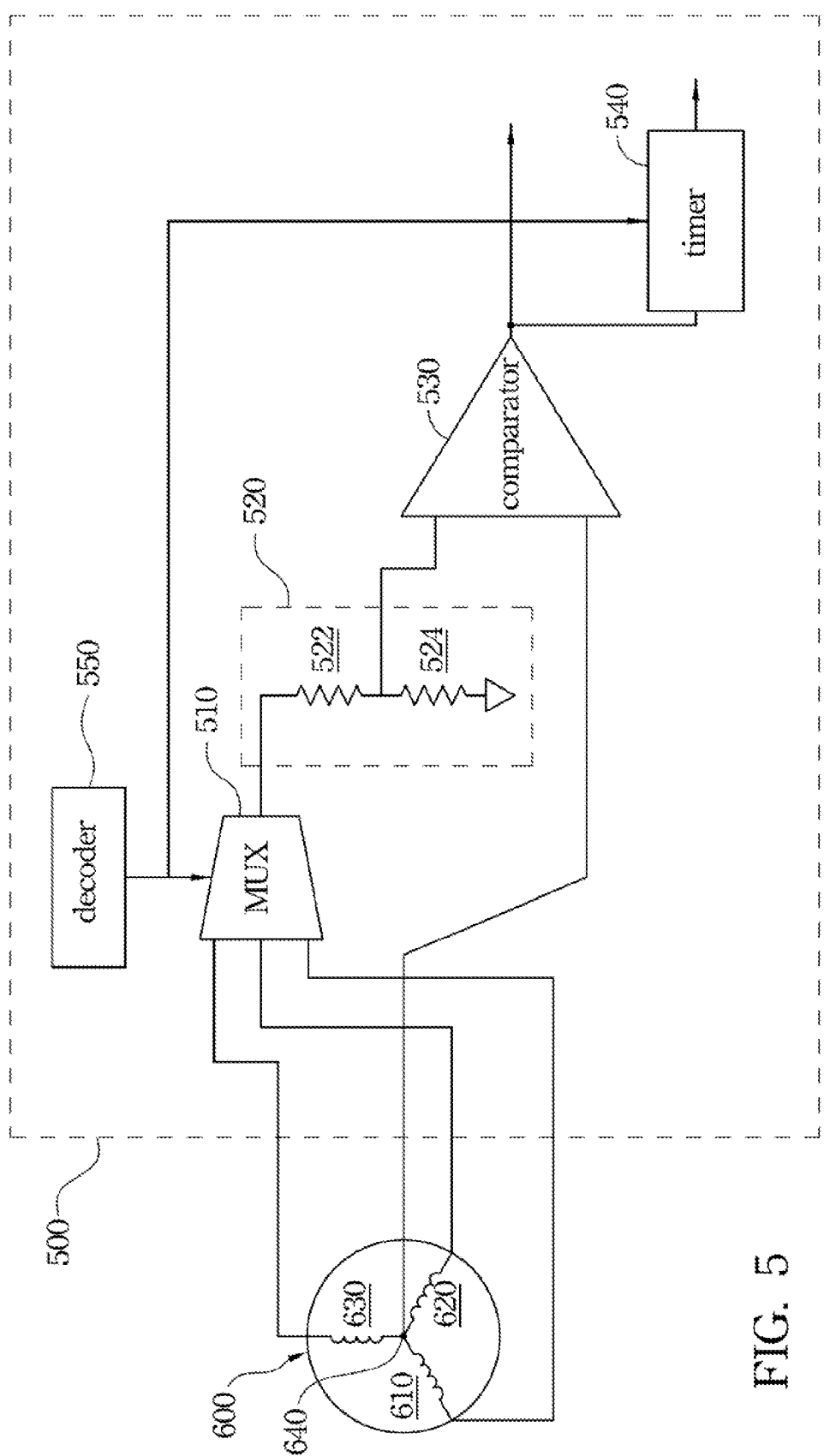
FIG. 5 shows schematically a block diagram of an apparatus for detecting a lock error in a sensorless motor according to yet another embodiment of the present invention.

FIG. 5 shows schematically a block diagram of an apparatus 500 for detecting a lock error in a sensorless motor 600 according to yet another embodiment of the present invention. The sensorless motor 600 comprises at least three coils 610, 620, and 630 converged on a neutral point 640. The apparatus comprises a multiplexer 510, a negative booster 520, a comparator 530, and a timer 540.

In this embodiment, the multiplexer 510 is electrically connected to the coils 610, 620, and 630, the negative booster 520 is electrically connected to the multiplexer 510, the negative booster 520 and the neutral point 640 are electrically connected to the comparator 530 respectively, and the timer 540 is electrically connected to the comparator 530.

The multiplexer 510 can receive a coil voltage from one of the coils 610, 620, and 630, and negative booster 520 can drop the coil voltage. The comparator 530 can compare the neutralizing voltage of the neutral point with the dropped coil voltage to output a zero-crossing signal. When crossover occurs between the neutralizing voltage and the dropped coil voltage, the zero-crossing signal is converted from having a first logical level into having a second logical level or converted from having the second logical level into having the first logical level. The timer 540 can count a time duration during the zero-crossing signal maintained at the first logical level and determine the lock error in the sensorless motor 600 when the time duration exceeds a predetermined period.

As a result, the operation of dropping the coil voltage overcomes a deviation generated by the comparator 530 and a noise disturbance so that the comparator 530 can discriminate the neutralizing voltage from the dropped coil voltage when the lock error in a sensorless motor occurs.

The first logical level is different from the second logical level. The apparatus 500 determines the lock error in the sensorless motor 600 when the time duration during the zero-crossing signal maintained at the high logical level exceeds a predetermined period.

Furthermore, the predetermined time duration depends on a rotational speed of the sensorless motor 600. The predetermined time duration becomes shorter when the rotational speed becomes faster while the predetermined time duration becomes longer when the rotational speed becomes slower. A person with ordinary skill in the art can flexibly determine the predetermined time duration according to actual demand.

As shown in FIG. 5, the apparatus 500 further comprises a decoder 550. The decoder 550 is electrically connected to the multiplexer 510 and the timer 540. The decoder 550 can make the multiplexer 510 select one of the coils 610, 620, and 630 and make the timer 540 start to count the time duration during the zero-crossing signal maintained at the first logical level after the coil is selected. Therefore, the decoder 550 can control the multiplexer 510 and the timer 540 to perform corresponding operation timely.

The negative booster 520 comprises a first voltage divider 522 and a second voltage divider 524. The first voltage divider 522 is electrically connected to the multiplexer 510, and the second voltage divider 524 is connected to the first voltage divider 522 in series, wherein the position at which the first voltage divider 522 and the second voltage divider 524 are connected to each other is electrically connected to the comparator 530.

Specifically, each of the first voltage divider 522 and the second voltage divider 524 can be a resistor for dropping the coil voltage. The resistance of the first voltage divider 522 and the second voltage divider 524 is decided by a deviation generated by the comparator 530 and a noise disturbance so that the degree of the dropped coil voltage is enough for the comparator 530 discriminating the neutralizing voltage from the dropped coil voltage when the lock error in the sensorless motor 600 occurs. For example, the resistance of the first voltage divider 522 is 1 kΩ, and the resistance of the second voltage divider 524 is 100 kΩ.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An apparatus for detecting a lock error in a sensorless motor, wherein the sensorless motor comprises at least three coils converged on a neutral point, the apparatus at least comprising:
   a multiplexer for receiving a coil voltage from one of the coils;
   a negative booster for receiving a neutralizing voltage from the neutral point to drop the neutralizing voltage;
   a comparator for comparing the coil voltage with the dropped neutralizing voltage to output a zero-crossing signal, wherein when crossover occurs between the coil voltage and the dropped neutralizing voltage, the zero-crossing signal is converted from having a first logical level into having a second logical level or converted from having the second logical level into having the first logical level; and
   a timer for counting a time duration during the zero-crossing signal maintained at the first logical level and determining the lock error in the sensorless motor when the time duration exceeds a predetermined period.

2. The apparatus according to claim 1, further comprising:
   a decoder for making the multiplexer select one of the coils and making the timer start to count the time duration during the zero-crossing signal maintained at the first logical level after the coil is selected.

3. The apparatus according to claim 1, wherein the negative booster comprising:
   a first voltage divider connected to the neutral point; and
   a second voltage divider connected to the first potentiometer in series; wherein the position at which the first voltage divider and the second voltage divider are connected to each other is electrically connected to the comparator.

4. The apparatus according to claim 3, wherein each of the first voltage divider and the second voltage divider is a resistor.

5. The apparatus according to claim 1, wherein the first logical level is a logical high level, and the second logical level is a logical low level.

6. A method for detecting a lock error in a sensorless motor, wherein the sensorless motor comprises at least three coils converged on a neutral point, the method at least comprising:
   receiving a coil voltage from one of the coils;
   receiving a neutralizing voltage from a neutral point and dropping the neutralizing voltage;
   comparing the coil voltage with the dropped neutralizing voltage to output a zero-crossing voltage, wherein when crossover occurs between the coil voltage and the dropped neutralizing voltage, the zero-crossing signal is converted from having a first logical level into having a second logical level or converted from having the second logical level into having the first logical level; and
   counting a time duration during the zero-crossing signal maintained at the first logical level and determining the lock error in the sensorless motor when the time duration exceeds a predetermined period.

7. The method according to claim 6, wherein the step of receiving the coil voltage from one of the coils comprises:
   selecting a coil from the coils; and
   receiving the coil voltage from the selected coil after the coil is selected.

8. The method according to claim 7, wherein the step of counting the time duration during the zero-crossing signal maintained at the first logical level comprises:
   counting the time duration during the zero-crossing signal maintained at the first logical level after the coil is selected.

9. The method according to claim 6, wherein the first logical level at a high logical level is different from the second logical level.

10. The method according to claim 9, wherein the first logical level is the high logical level, and the second logical level is a low logical level.

11. An apparatus for detecting a lock error in a sensorless motor, wherein the sensorless motor comprises at least three coils converged on a neutral point, the apparatus at least comprising:
    a multiplexer for receiving a coil voltage from one of the coils;
    a negative booster for dropping the coil voltage;
    a comparator for comparing a neutralizing voltage of the neutral point with the dropped coil voltage to output a zero-crossing signal, wherein when crossover occurs between the neutralizing voltage and the dropped coil voltage, the zero-crossing signal is converted from having a first logical level into having a second logical level or converted from having the second logical level into having the first logical level; and
    a timer for counting a time duration during the zero-crossing signal maintained at the first logical level and determining the lock error in the sensorless motor when the time duration exceeds a predetermined period.

12. The apparatus according to claim 11, further comprising:
    a decoder for making the multiplexer select one of the coils and making the timer start to count the time duration during the zero-crossing signal maintained at the first logical level after the coil is selected.

13. The apparatus according to claim 11, wherein the negative booster comprising:
    a first voltage divider electrically connected to the multiplexer; and
    a second voltage divider connected to the first potentiometer in series; wherein the position at which the first voltage divider and the second voltage divider are connected to each other is electrically connected to the comparator.

14. The apparatus according to claim 13, wherein each of the first voltage divider and the second voltage divider is a resistor.

15. The apparatus according to claim 11, wherein the logical levels are the logical high level and the logical low level respectively.

* * * * *